C. B. CARR.
HEIGHT MEASURING ATTACHMENT FOR SCALES.
APPLICATION FILED APR. 15, 1911.
1,001,814.
Patented Aug. 29, 1911.
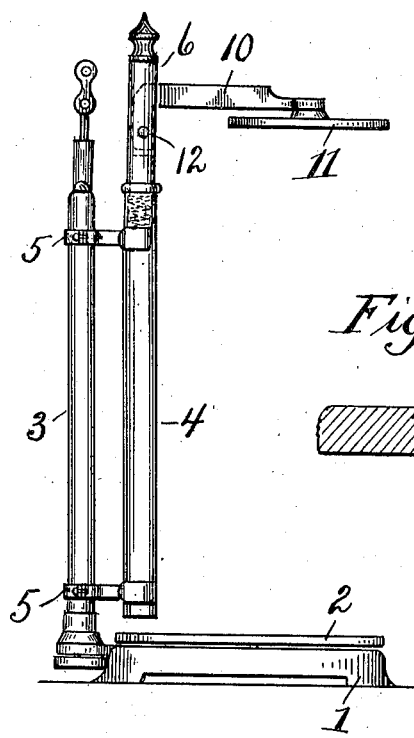
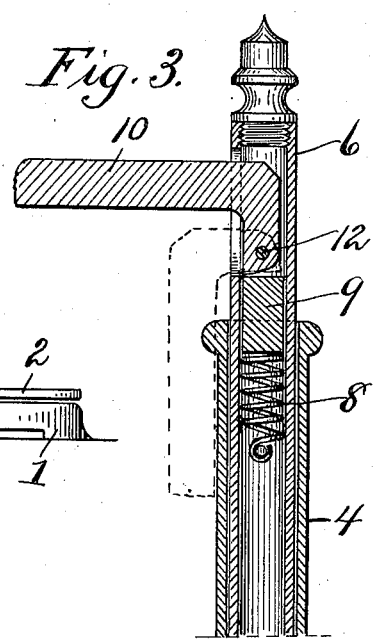
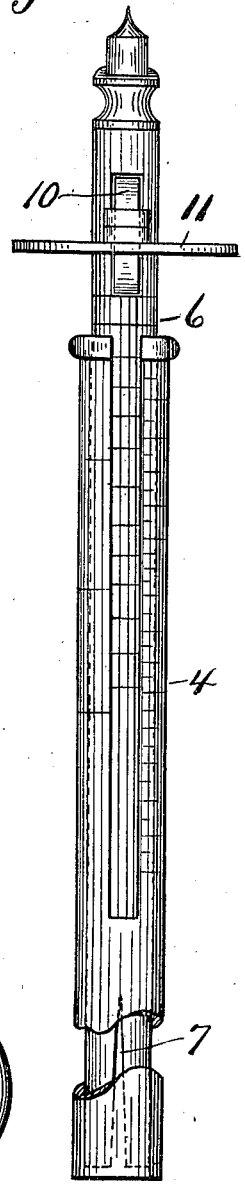
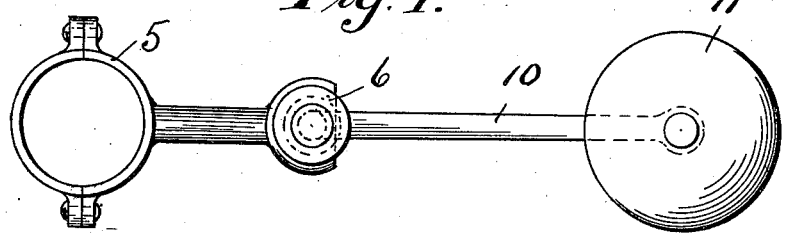

UNITED STATES PATENT OFFICE.

CHARLES B. CARR, OF ST. JOHNSBURY, VERMONT.

HEIGHT-MEASURING ATTACHMENT FOR SCALES.

1,001,814.  Specification of Letters Patent.  Patented Aug. 29, 1911.

Application filed April 15, 1911. Serial No. 621,435.

*To all whom it may concern:*

Be it known that I, CHARLES B. CARR, a citizen of the United States, residing at St. Johnsbury, in the county of Caledonia, State of Vermont, have invented certain new and useful Improvements in Height-Measuring Attachments for Scales, of which the following is a description, reference being had to the accompanying drawing and to the letters and figures of reference marked thereon.

My invention relates to an improvement in scales, especially of the platform type, and more particularly to a height measuring attachment for scales such as are used by physicians, or in baths, gymnasiums, or the like. As heretofore constructed so far as I am aware, the measuring rods used in connection with such scales began at four feet, and were graduated up to seven feet, that is, measuring nothing under four feet.

There is demand to-day in public schools and in other places, for measuring rods that will measure from two feet six inches, and it is the object of my invention to provide primarily a device in which the stationary part or the part in which the telescoping graduated rod moves, is graduated up to a certain height, while from that point beyond the telescoping rod carries additional graduations.

Furthermore, the invention includes certain details of construction, all as hereinafter described and referred to in the appended claims.

In the accompanying drawings which illustrate the invention; Figure 1 is a side elevation of a platform scale to which my attachment is applied; Fig. 2 is a front view of the height measuring attachment; Fig. 3 is a sectional view; and Fig. 4 is a top plan view.

In these drawings, 1 represents the base of the scale; 2 the platform thereon; and 3, the scale column or standard.

4 represents a hollow rod which is graduated in feet and inches up to a certain height, and is supported by brackets or braces 5, from the scale column or standard 3.

6 represents a hollow tubular rod telescoping within the tube 4 and which is split at its lower end as shown at 7 in order to frictionally engage the inside wall of the tube 4.

Within the telescoping tube 6, is secured at one end a spring 8 supporting upon its upper face a plunger 9, and pivoted within said tube 6, is one end of the arm or bracket 10, which carries at its outer end the head rest 11. The spring actuating plunger 9 normally tends to keep the arm 10 in the horizontal position shown in full lines in Fig. 3, or in vertical position shown in dotted lines in Fig. 3. When it is desired to use the scale for the measuring of heights, the arm 10 is swung upwardly on its pivot 12, and the vertical part of said horizontal arm forces down the plunger against the pressure of the spring, until the end of the vertical part of the arm has passed the dead center when the plunger tends to hold the arm in the position shown in dotted lines in Fig. 3. When it is desired to use the head rest and the arm 10 is moved toward horizontal position, the spring actuated plunger keeps the same in said horizontal position.

It will be understood that various modifications and changes may be made without departing from the spirit of the invention.

Having thus particularly described my invention, what I claim as new and desire to secure by Letters Patent, is:—

1. The combination with a scale, a height measuring attachment comprising a hollow rod, a hollow rod telescoping therein and provided with a split lower end for frictional engagement with the inner wall of the rod within which it telescopes and a head rest arm pivoted at one end within the inner rod, and means for holding it in normal position.

2. In combination with the hollow rods, one telescoping within the other, a spring actuated plunger within the inner rod, and a head rest arm pivoted within said inner rod, and held in either of its normal positions by the spring actuated plunger.

In testimony whereof I affix my signature, in presence of two witnesses.

CHARLES B. CARR.

Witnesses:
G. C. FRYE,
J. S. ELLIS.

Copies of this patent may be obtained for five cents each, by addressing the "Commissioner of Patents, Washington, D. C."